United States Patent
Jinnai et al.

(10) Patent No.: US 11,131,298 B2
(45) Date of Patent: Sep. 28, 2021

(54) COMPRESSOR AND OUTDOOR UNIT OF AIR-CONDITIONING APPARATUS

(71) Applicant: Mitsubishi Electric Corporation, Tokyo (JP)

(72) Inventors: Hiroyuki Jinnai, Tokyo (JP); Toshiyuki Kubono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/616,694

(22) PCT Filed: Jul. 27, 2017

(86) PCT No.: PCT/JP2017/027268
§ 371 (c)(1),
(2) Date: Nov. 25, 2019

(87) PCT Pub. No.: WO2019/021423
PCT Pub. Date: Jan. 31, 2019

(65) Prior Publication Data
US 2020/0208622 A1    Jul. 2, 2020

(51) Int. Cl.
*F04B 39/02* (2006.01)
*F04B 39/12* (2006.01)
(Continued)

(52) U.S. Cl.
CPC ............ *F04B 39/023* (2013.01); *F04B 17/03* (2013.01); *F04B 35/04* (2013.01); *F04B 39/121* (2013.01);
(Continued)

(58) Field of Classification Search
CPC ........ F04B 17/03; F04B 35/04; F04B 39/121; F04B 53/16; F04B 39/023; F04C 2240/30;
(Continued)

(56) References Cited

U.S. PATENT DOCUMENTS

| | | | | |
|---|---|---|---|---|
| 6,779,989 B2* | 8/2004 | Makino | ................... | F04B 35/04 417/410.1 |
| 7,387,519 B2* | 6/2008 | Sugiyama | ............ | H01R 13/447 174/138 F |
| 8,262,372 B2* | 9/2012 | Wang | .................... | F04C 23/008 417/410.1 |
| 8,608,514 B2* | 12/2013 | Kolkman | ............. | H01R 25/003 439/685 |

(Continued)

FOREIGN PATENT DOCUMENTS

JP    2012-082776 A    4/2012

OTHER PUBLICATIONS

International Search Report of the International Searching Authority dated Oct. 31, 2017 for the corresponding International application No. PCT/JP2017/027268 (and English translation).

(Continued)

*Primary Examiner* — Christopher S Bobish
(74) *Attorney, Agent, or Firm* — Posz Law Group, PLC

(57) ABSTRACT

A compressor includes a terminal cover. The terminal cover includes a first terminal protector protecting a first glass-sealed terminal assembly, a first power line guide guiding first power lines connected to the first glass-sealed terminal assembly, a first power line outlet through which the first power lines extend outward, a second terminal protector protecting a second glass-sealed terminal assembly, a second power line guide guiding second power lines connected to the second glass-sealed terminal assembly, and a second power line outlet through which the second power lines extend outward. The first power line guide guides the first power lines in a guiding direction away from the second terminal protector. The second power line guide guides the second power lines such that the second power lines bypass the first terminal protector and are directed in a direction identical to the guiding direction.

7 Claims, 8 Drawing Sheets

(51) Int. Cl.
| | |
|---|---|
| *H02K 5/22* | (2006.01) |
| *F04B 53/16* | (2006.01) |
| *F04B 17/03* | (2006.01) |
| *F04B 35/04* | (2006.01) |
| *H01R 13/52* | (2006.01) |
| *H01R 9/24* | (2006.01) |

(52) U.S. Cl.
CPC ............ *F04B 53/16* (2013.01); *H01R 9/2416* (2013.01); *H01R 13/5213* (2013.01); *H02K 5/225* (2013.01); *F04C 2240/30* (2013.01); *F04C 2240/40* (2013.01); *F04C 2240/803* (2013.01)

(58) Field of Classification Search
CPC ........... F04C 2240/40; F04C 2240/803; H02K 5/225; H01R 13/5213; H01R 9/2416; F24F 1/22
See application file for complete search history.

(56) References Cited

U.S. PATENT DOCUMENTS

| | | | |
|---|---|---|---|
| 8,801,400 B2* | 8/2014 | Thibodeaux | F04B 39/14 417/410.1 |
| 8,939,735 B2* | 1/2015 | Heidecker | F04B 39/121 417/410.1 |
| 9,537,363 B2* | 1/2017 | Thompson | F04D 29/624 |
| 10,485,128 B2* | 11/2019 | Trudeau, Jr. | F04C 28/28 |
| 2014/0300225 A1* | 10/2014 | Okumura | H02K 5/225 310/71 |

OTHER PUBLICATIONS

Office Action dated Jun. 17, 2021, issued in corresponding CN Patent Application No. 201780092537.7 (and English Machine Translation).

\* cited by examiner

COMPRESSOR AND OUTDOOR UNIT OF AIR-CONDITIONING APPARATUS

CROSS REFERENCE TO RELATED APPLICATION

This application is a U.S. national stage application of PCT/JP2017/027268 filed on Jul. 27, 2017, the contents of which are incorporated herein by reference.

TECHNICAL FIELD

The present invention relates to a compressor including a first glass-sealed terminal assembly and a second glass-sealed terminal assembly and an air-conditioning-apparatus outdoor unit including the compressor.

BACKGROUND ART

Patent Literature 1 discloses a hermetic compressor including a first sealed terminal and a second sealed terminal. The first sealed terminal and the second sealed terminal are arranged side by side in a terminal box disposed on an upper cover of a hermetic casing. The first sealed terminal and the second sealed terminal each include three pins. Three power connection lines connected in one-to-one correspondence to the three pins of the first sealed terminal and three power connection lines connected in one-to-one correspondence to the three pins of the second sealed terminal extend outward through an opening of the terminal box.

CITATION LIST

Patent Literature

Patent Literature 1: Japanese Unexamined Patent Application Publication No. 2012-82776

SUMMARY OF INVENTION

Technical Problem

When disposing the compressor in an outdoor unit, the power connection lines extending from the compressor are connected to power connection lines extending from an inverter by junction connectors. In the hermetic compressor disclosed in Patent Literature 1, the six power connection lines in total extend outward through the single opening. Disadvantageously, it is difficult to determine whether each of the power connection lines is connected to the first sealed terminal or the second sealed terminal. Unfortunately, the power connection lines tend to be incorrectly connected to the power connection lines extending from the inverter.

The present invention has been made to solve the above-described problem and aims at providing a compressor in which incorrect connection of power lines can be prevented and an air-conditioning-apparatus outdoor unit including the compressor.

Solution to Problem

A compressor according to an embodiment of the present invention includes a hermetic container, an electric motor disposed in the hermetic container, a first glass-sealed terminal assembly located at an outer surface of the hermetic container and includes first terminals electrically connected to the electric motor, a second glass-sealed terminal assembly juxtaposed to the first glass-sealed terminal assembly at the outer surface of the hermetic container and includes second terminals electrically connected to the electric motor, and a terminal cover attached to the hermetic container to cover the first glass-sealed terminal assembly and the second glass-sealed terminal assembly. The terminal cover includes a first terminal protector protecting the first glass-sealed terminal assembly, a first power line guide guiding first power lines connected in one-to-one correspondence to the first terminals of the first glass-sealed terminal assembly, a first power line outlet through which the first power lines guided by the first power line guide extend out of the terminal cover, a second terminal protector protecting the second glass-sealed terminal assembly, a second power line guide guiding second power lines connected in one-to-one correspondence to the second terminals of the second glass-sealed terminal assembly, and a second power line outlet through which the second power lines guided by the second power line guide extend out of the terminal cover. The first power line guide guides the first power lines in a guiding direction away from the second terminal protector. The second power line guide guides the second power lines such that the second power lines bypass the first terminal protector and are directed in a direction identical to the guiding direction.

An air-conditioning-apparatus outdoor unit according to an embodiment of the present invention includes the compressor according to the above-described embodiment of the present invention.

Advantageous Effects of Invention

According to the embodiment of the present invention, the terminal cover includes the first power line outlet, through which the first power lines connected to the first glass-sealed terminal assembly extend outward, and the second power line outlet, through which the second power lines connected to the second glass-sealed terminal assembly extend outward. Such a structure facilitates distinction between the first power lines connected to the first glass-sealed terminal assembly and the second power lines connected to the second glass-sealed terminal assembly. This prevents the first power lines and the second power lines from being incorrectly connected to a power source.

DESCRIPTION OF EMBODIMENTS

Embodiment 1

Figure 1:
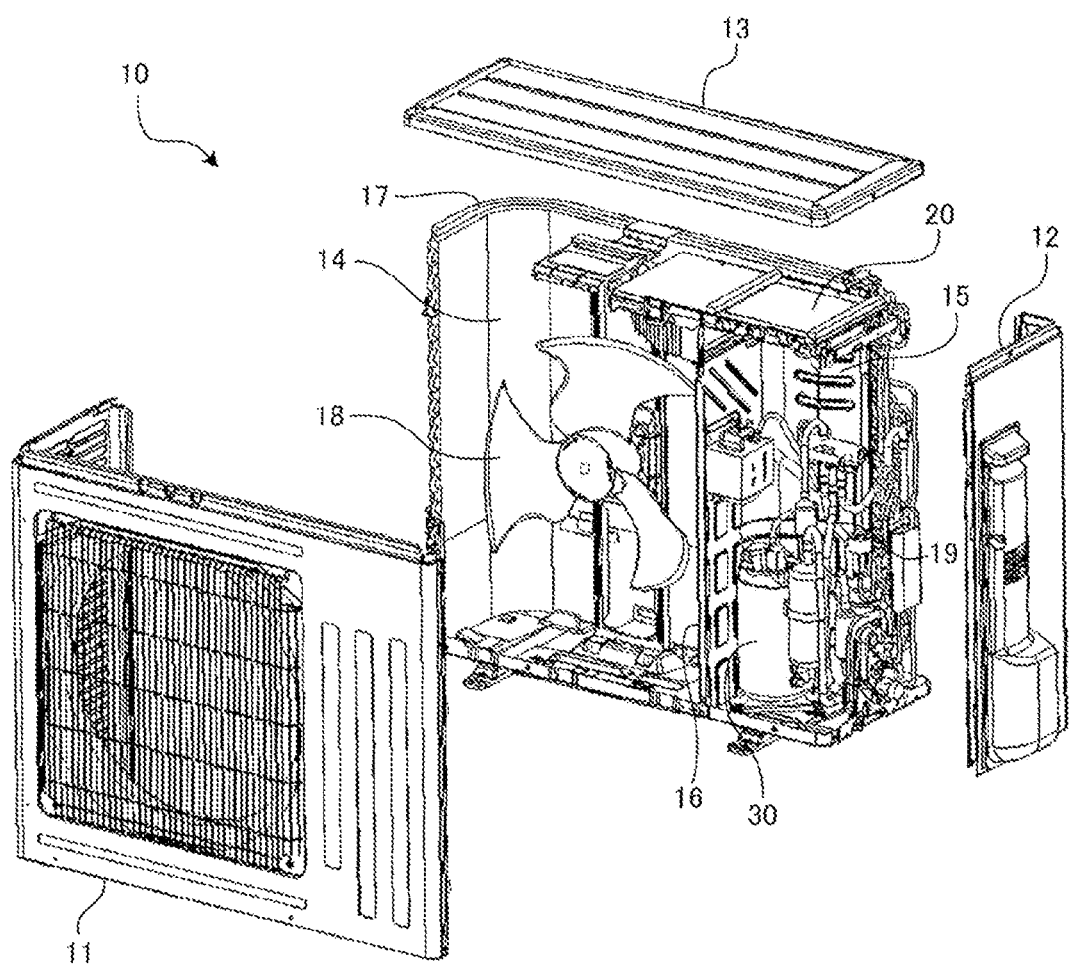
FIG. 1 is an exploded perspective view of the configuration of an air-conditioning-apparatus outdoor unit 10 according to Embodiment 1 of the present invention.

A compressor according to Embodiment 1 and an air-conditioning-apparatus outdoor unit according to Embodiment 1 of the present invention will be described. FIG. 1 is an exploded perspective view of the configuration of an air-conditioning-apparatus outdoor unit 10 according to Embodiment 1. As illustrated in FIG. 1, the outdoor unit 10 includes an outer casing including a front panel 11, a side panel 12, and a top panel 13. The outdoor unit 10 has therein a fan chamber 14 and a machine chamber 15. The fan chamber 14 is separated from the machine chamber 15 by a partition 16.

The fan chamber 14 contains a heat exchanger 17, serving as a heat source side heat exchanger of a refrigeration cycle apparatus, and a fan 18 that supplies outdoor air to the heat exchanger 17. The machine chamber 15 contains in its lower part a compressor 30 and a refrigerant pipe 19, each of which forms part of the refrigeration cycle apparatus. The machine chamber 15 contains electric equipment 20 in its upper part. The electric equipment 20 includes an inverter 70, a connection switching device 71, and an inverter board on which the inverter and the switching device are mounted. The inverter 70 and the connection switching device 71 will be described later.

Figure 2:
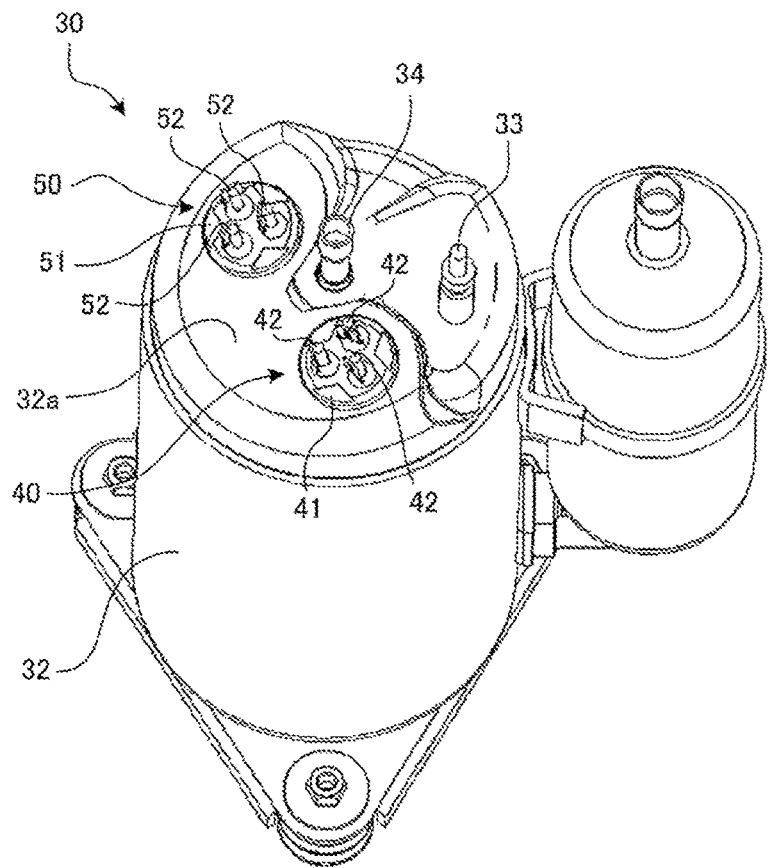
FIG. 2 is a perspective view of the configuration of a compressor 30 according to Embodiment 1 of the present invention as viewed from above.
Figure 3:
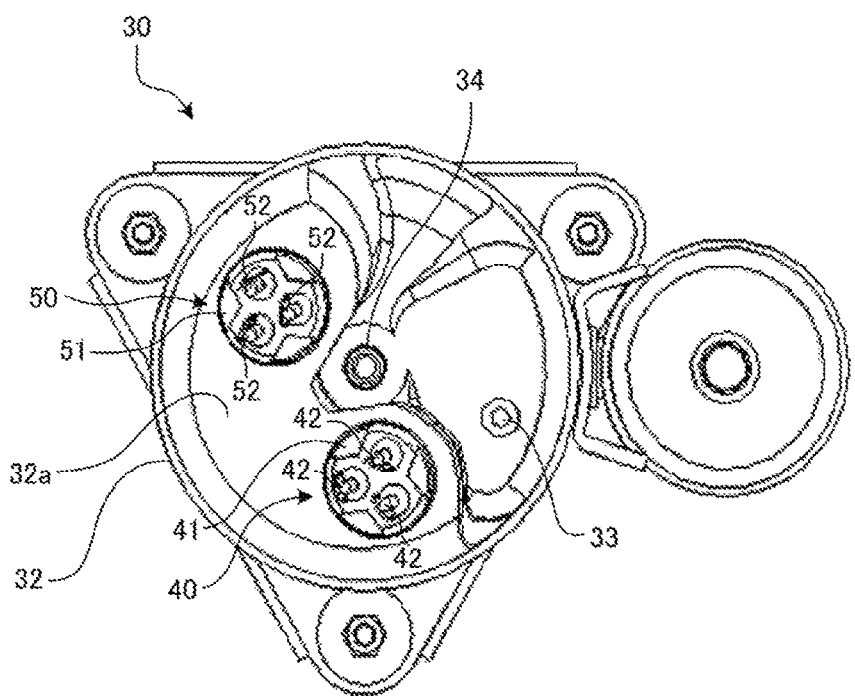
FIG. 3 is a top plan view of the configuration of the compressor 30 according to Embodiment 1 of the present invention.

FIG. 2 is a perspective view of the configuration of the compressor 30 according to Embodiment 1 as viewed from above. FIG. 3 is a top plan view of the configuration of the compressor 30 according to Embodiment 1. As illustrated in FIGS. 2 and 3, the compressor 30 includes a cylindrical hermetic container 32. The hermetic container 32 contains an electric motor 31 (refer to FIG. 5) and a compression mechanism driven by the electric motor 31.

The hermetic container 32 has an upper surface 32a. A discharge pipe 34 through which fluid compressed by the compression mechanism is discharged is disposed in central part of the upper surface 32a. The upper surface 32a includes a first glass-sealed terminal assembly 40 and a second glass-sealed terminal assembly 50. The first glass-sealed terminal assembly 40 and the second glass-sealed terminal assembly 50 are arranged in a side-by-side relation, with the discharge pipe 34 interposed therebetween.

The first glass-sealed terminal assembly 40 includes a first base 41 and three first terminals 42 extending through the first base 41. The first base 41 is circular in a plan view and protrudes from the upper surface 32a. The three first terminals 42 are electrically connected to the electric motor 31 disposed in the hermetic container 32. The three first terminals 42 are connected to first ends of three first power lines 43 (refer to FIG. 5) to supply power to the electric motor 31. Second ends of the three first power lines 43 are connected to the inverter board, serving as a power source for the compressor 30.

Similarly, the second glass-sealed terminal assembly 50 includes a second base 51 and three second terminals 52 extending through the second base 51. The second base 51 is circular in a plan view and protrudes from the upper surface 32a. The second base 51 is distant from the first base 41. The three second terminals 52 are electrically connected to the electric motor 31 disposed in the hermetic container 32. The three second terminals 52 are connected to first ends of three second power lines 53 (refer to FIG. 5) to supply power to the electric motor 31 of the compressor 30. Second ends of the three second power lines 53 are connected to the inverter board, serving as the power source for the compressor 30.

Power to operate the outdoor unit 10 is typically supplied to a terminal block included in the electric equipment 20. Part of the power supplied to the terminal block is supplied to the electric motor 31 via the inverter board, the first glass-sealed terminal assembly 40, and the second glass-sealed terminal assembly 50. To replace the board because of, for example, a failure of the inverter, the electric equipment 20 may be detached from the outdoor unit 10. To easily detach the electric equipment 20, easily detachable junction connectors are typically arranged in the power lines connecting the inverter board and the first glass-sealed terminal assembly 40 and the power lines connecting the inverter board and the second glass-sealed terminal assembly 50.

Figure 4:
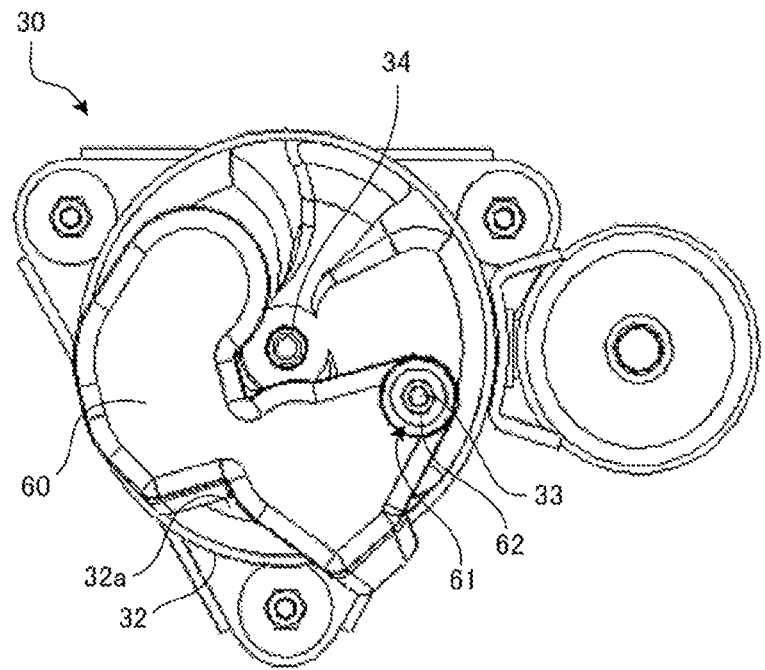
FIG. 4 is a top plan view of the compressor 30 according to Embodiment 1 of the present invention with a terminal cover 60 attached to an upper surface 32a of the compressor.

FIG. 4 is a top plan view of the compressor 30 according to Embodiment 1 with a terminal cover 60 attached to the upper surface 32a. As illustrated in FIG. 4, when the terminal cover 60 is attached to the upper surface 32a of the hermetic container 32, the first glass-sealed terminal assembly 40 and the second glass-sealed terminal assembly 50 are integrally covered by the terminal cover 60. Thus, the first glass-sealed terminal assembly 40 and the second glass-sealed terminal assembly 50 are protected against dust and water. A bolt 33 to fasten the terminal cover 60 is attached to the upper surface 32a of the hermetic container 32. The terminal cover 60 has a fastening hole 61 through which the bolt 33 extends. Tightening a nut 62 onto the bolt 33 extending through the fastening hole 61 of the terminal cover 60 fastens the terminal cover 60 to the upper surface 32a of the hermetic container 32. The structure of the terminal cover 60 will be described in detail later.

Figure 5:
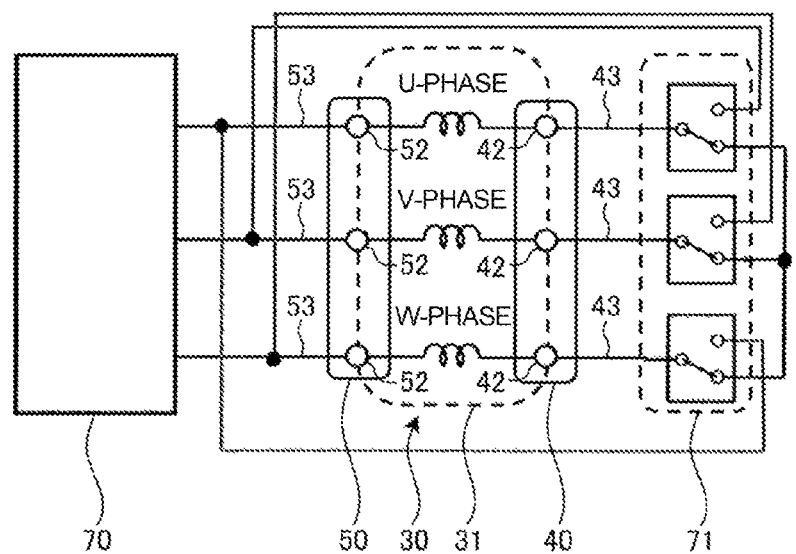
FIG. 5 is a connection diagram illustrating the relationship between an electric motor 31 included in the compressor 30 according to Embodiment 1 of the present invention, an inverter 70 as part of electric equipment 20, and a connection switching device 71 as part of the electric equipment.

FIG. 5 is a connection diagram illustrating the relationship between the electric motor 31 included in the compressor 30 according to Embodiment 1, the inverter 70, and the connection switching device 71. The inverter 70 and the connection switching device 71 serve as parts of the electric equipment 20. In Embodiment 1, a three-phase permanent-magnet electric motor is illustrated as an example of the electric motor 31. As illustrated in FIG. 5, the electric motor 31 includes U-phase, V-phase, and W-phase inner windings. First ends of the U-phase, V-phase, and W-phase inner windings are connected to the three first terminals 42 of the first glass-sealed terminal assembly 40 in the hermetic container 32. The three first terminals 42 are connected to the connection switching device 71 by the three first power lines 43. Second ends of the U-phase, V-phase, and W-phase inner windings are connected to the three second terminals 52 of the second glass-sealed terminal assembly 50 in the hermetic container 32. The second terminals 52 are connected to the inverter 70 by the three second power lines 53. The connection switching device 71 includes three relays. Contacts of the three relays of the connection switching device 71 are changed over in response to an instruction from the inverter 70, thereby appropriately changing the connection of the U-phase, V-phase, and W-phase inner windings. Both the inverter 70 and the connection switching device 71 are mounted on the inverter board.

Figure 6:
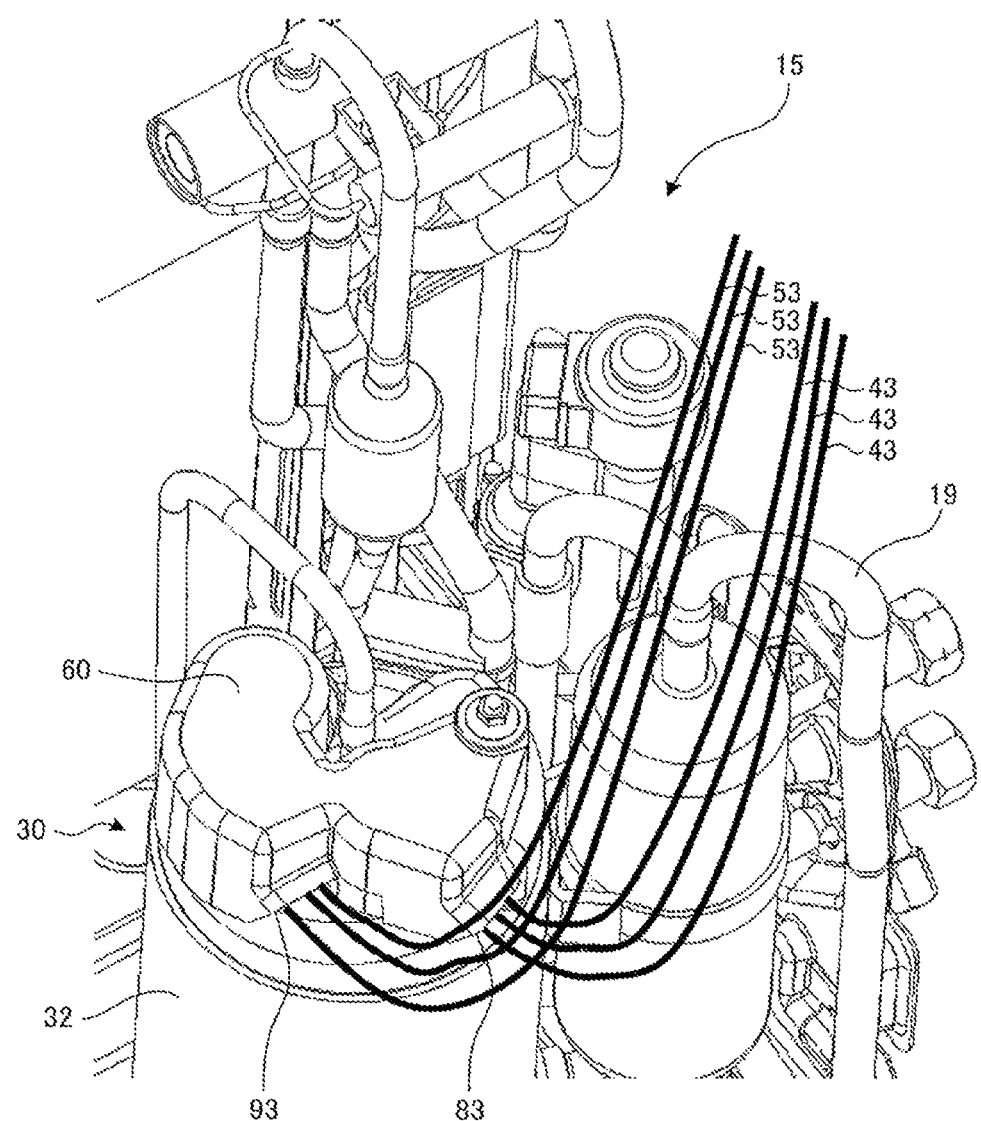
FIG. 6 is a perspective view illustrating the compressor 30 disposed in a machine chamber 15 of the air-conditioningapparatus outdoor unit 10 according to Embodiment 1 of the present invention as viewed from above.

FIG. 6 is a perspective view illustrating the compressor 30 disposed in the machine chamber 15 of the air-conditioning-apparatus outdoor unit 10 according to Embodiment 1 as viewed from above. As illustrated in FIG. 6, the first glass-sealed terminal assembly 40 and the second glass-sealed terminal assembly 50 of the compressor 30 are covered by the terminal cover 60, which is integrally molded. The three first power lines 43 connected to the first glass-sealed terminal assembly 40 extend out of the terminal cover 60 through a single first power line outlet 83. The three second power lines 53 connected to the second glass-sealed terminal assembly 50 extend out of the terminal cover 60 through a single second power line outlet 93 separate from the first power line outlet 83. When the compressor 30 is viewed from above, the three first power lines 43 extend out of the terminal cover 60 in substantially the same direction as that in which the three second power lines 53 extend out of the terminal cover 60. The three first power lines 43 extending out of the terminal cover 60 extend upward and are connected to the inverter board, which is disposed above the compressor 30, by the junction connectors (not illustrated) for the first power lines. The three second power lines 53 extending out of the terminal cover 60 extend upward in a manner similar to the first power lines 43 and are connected to the inverter board by the junction connectors (not illustrated) for the second power lines.

Figure 7:
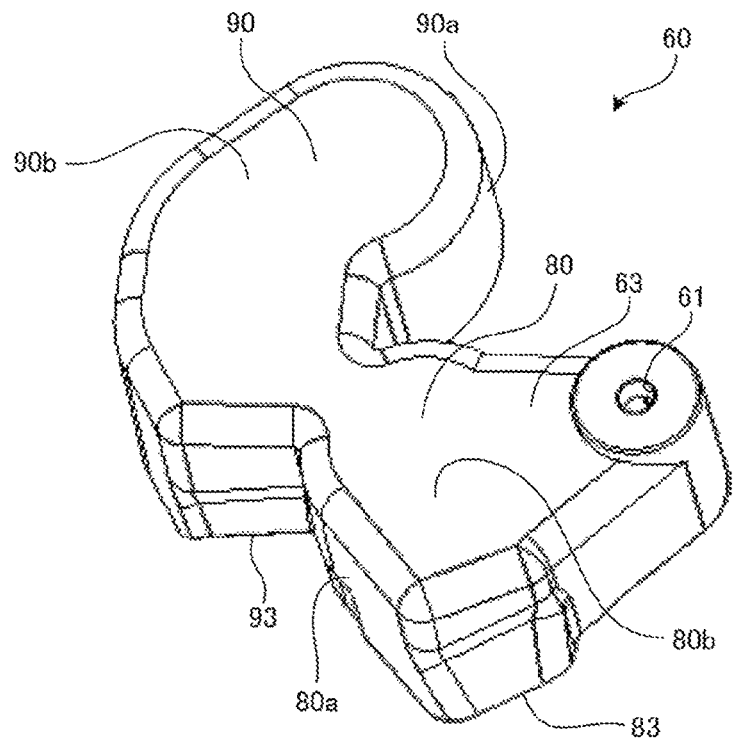
FIG. 7 is a perspective view of the structure of the terminal cover 60 included in the compressor 30 according to Embodiment 1 of the present invention as viewed from above.
Figure 8:
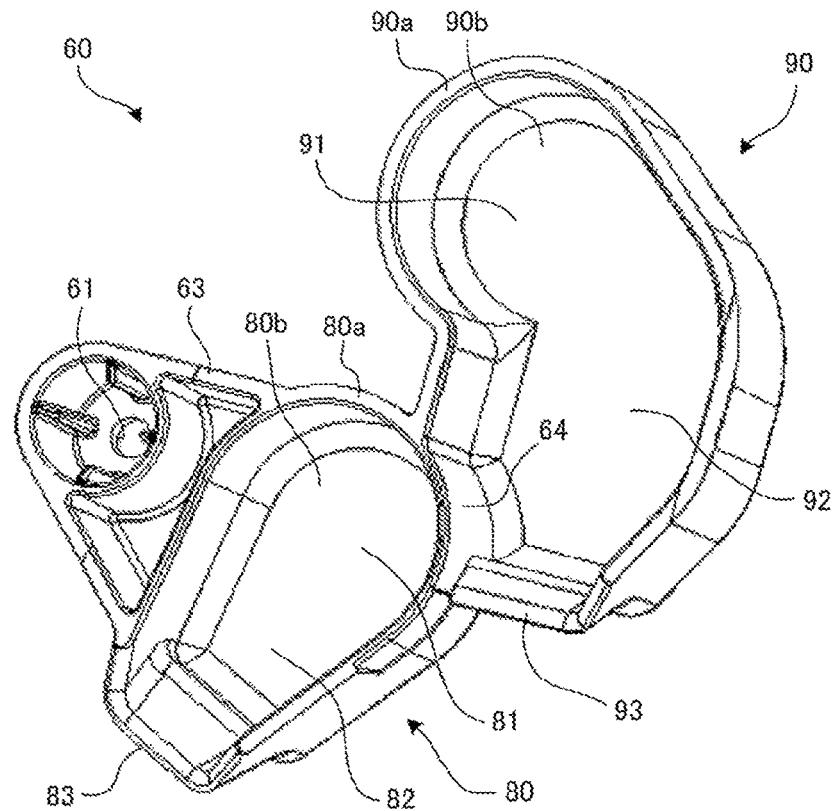
FIG. 8 is a perspective view of the structure of the terminal cover 60 included in the compressor 30 according to Embodiment 1 of the present invention as viewed from below.
Figure 9:
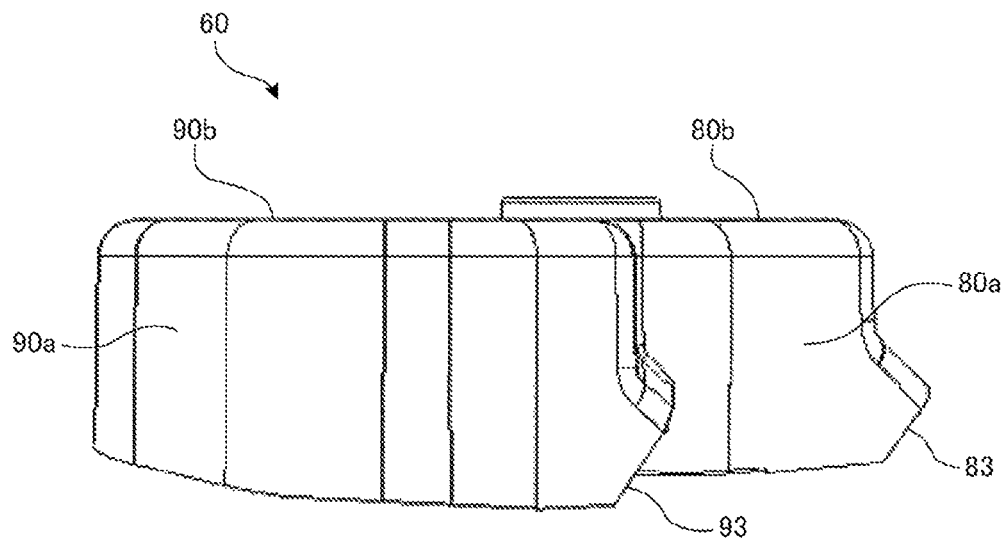
FIG. 9 is a side view of the structure of the terminal cover 60 included in the compressor 30 according to Embodiment 1 of the present invention.
Figure 10:
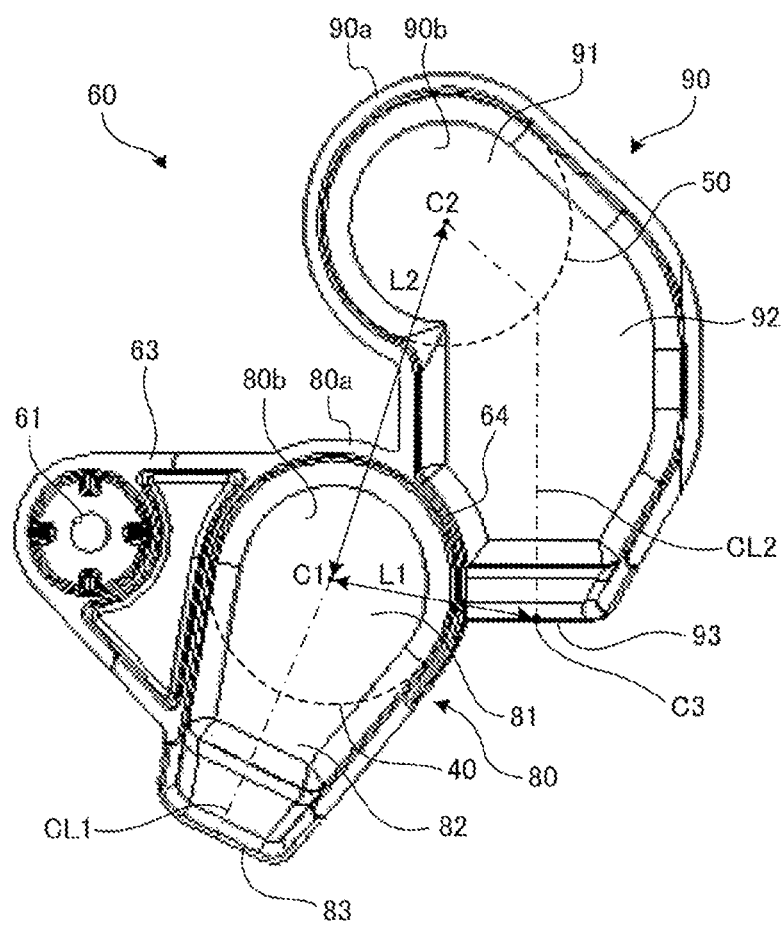
FIG. 10 is a bottom plan view of the structure of the terminal cover 60 included in the compressor 30 according to Embodiment 1 of the present invention.

FIG. 7 is a perspective view of the structure of the terminal cover 60 included in the compressor 30 according to Embodiment 1 as viewed from above. FIG. 8 is a perspective view of the structure of the terminal cover 60 included in the compressor 30 according to Embodiment 1 as viewed from below. FIG. 9 is a side view of the structure of the terminal cover 60 included in the compressor 30 according to Embodiment 1. FIG. 10 is a bottom plan view of the structure of the terminal cover 60 included in the compressor 30 according to Embodiment 1.

As illustrated in FIGS. 7 to 10, the terminal cover 60, which is integrally molded, includes a first cover portion 80 covering the first glass-sealed terminal assembly 40, a second cover portion 90 covering the second glass-sealed terminal assembly 50, and a fastening portion 63 having the fastening hole 61.

The first cover portion 80 includes a side part 80*a* and an upper part 80*b*. The first cover portion 80 has a single chamber surrounded by the side part 80*a*. The upper part 80*b* defines an upper end of the chamber in the first cover portion 80. The chamber in the first cover portion 80 has an open lower end.

The first cover portion 80 includes a first terminal protector 81 protecting the first glass-sealed terminal assembly 40 and a first power line guide 82 guiding the three first power lines 43 (refer to FIG. 11), which are connected to the first glass-sealed terminal assembly 40, to the first power line outlet 83. The first terminal protector 81 includes a circular portion of the upper part 80*b* that is located above the first glass-sealed terminal assembly 40, and further includes the side part 80*a*, which is semi-cylindrical, surrounding the circular portion. An internal space of the first terminal protector 81 forms part of the above-described chamber. The first power line guide 82 connects to the first terminal protector 81 and decreases in width toward the first power line outlet 83. An internal space of the first power line guide 82 constitutes the other part of the above-described chamber. The first power line guide 82 guides the three first power lines 43 connected to the first glass-sealed terminal assembly 40 in a direction away from a second terminal protector 91, which will be described later, in a plan view perpendicular to the upper part 80*b*.

The second cover portion 90 includes a side part 90*a* and an upper part 90*b*, which is flush with the upper part 80*b*. The second cover portion 90 has a single chamber, which is separate from the chamber in the first cover portion 80, surrounded by the side part 90*a*. The upper part 90*b* defines an upper end of the chamber in the second cover portion 90. The chamber in the second cover portion 90 has an open lower end.

The second cover portion 90 includes a second terminal protector 91 protecting the second glass-sealed terminal assembly 50 and a second power line guide 92 guiding the three second power lines 53 (refer to FIG. 11), which are connected to the second glass-sealed terminal assembly 50, to the second power line outlet 93. The second terminal protector 91 includes a circular portion of the upper part 90*b* that is located above the second glass-sealed terminal assembly 50, and further includes the side part 90*a*, which is semi-cylindrical, surrounding the circular portion. An internal space of the second terminal protector 91 constitutes part of the above-described chamber. The second power line guide 92 connects to the second terminal protector 91 and decreases in width toward the second power line outlet 93. An internal space of the second power line guide 92 forms the other part of the above-described chamber. The second power line guide 92 guides the three second power lines 53, connected to the second glass-sealed terminal assembly 50, in the following manner in a plan view perpendicular to the upper part 90*b*. The second power line guide 92 guides the three second power lines 53 such that the second power lines bypass the first terminal protector 81, extend along the periphery of the first terminal protector 81, and are directed in the same direction as that in which the first power line guide 82 guides the first power lines 43.

Part of the second power line guide 92 is located adjacent to the first terminal protector 81. In this part of the second power line guide 92 adjacent to the first terminal protector 81, the second power line guide 92 is separated from the first terminal protector 81 by a curved partition wall 64, serving as both the side part 90*a* and the side part 80*a*.

The first power line outlet 83 is a lower opening of the side part 80*a* (refer to FIG. 9). The first power line outlet 83 faces downward. Thus, the first power line outlet 83 allows the three first power lines 43 extending outward therethrough to extend downward, curve downward, and then extend upward toward the inverter board located at a higher level. This arrangement prevents condensate that forms in the machine chamber 15 and flows downward on the first power lines 43 from entering the terminal cover 60.

Similarly, the second power line outlet 93 is a lower opening of the side part 90*a*. The second power line outlet 93 faces downward. Thus, the second power line outlet 93 allows the three second power lines 53 extending outward therethrough to extend downward, curve downward, and then extend upward toward the inverter board located at a higher level. This arrangement prevents condensate that forms in the machine chamber 15 and flows downward on the second power lines 53 from entering the terminal cover 60.

The first power line outlet 83 and the second power line outlet 93 open in substantially the same direction and are not aligned with each other in a plan view perpendicular to the upper part 80b and the upper part 90b.

Referring to FIG. 10, broken lines represent the outlines of the first and second glass-sealed terminal assemblies 40 and 50 superposed on the terminal cover 60 attached to the upper surface 32a of the hermetic container 32. As illustrated in FIG. 10, the side part 80a of the first terminal protector 81 extends along the periphery of the first base 41 of the first glass-sealed terminal assembly 40 and has a semi-cylindrical shape. In a plan view perpendicular to the upper part 80b, the first terminal protector 81 has a center C1 and the first power line guide 82 has a center line CL1 extending from the center C1 to the first power line outlet 83. In this case, the center line CL1 is a straight line extending from the center C1 to the first power line outlet 83 in the direction away from the second terminal protector 91. The first power line guide 82 guides the first power lines 43 in a direction parallel to the center line CL1. Furthermore, the first power lines 43 extend outward through the first power line outlet 83 in the direction parallel to the center line CL1 in a plan view perpendicular to the upper part 80b.

The side part 90a of the second terminal protector 91 extends along the periphery of the second base 51 of the second glass-sealed terminal assembly 50 and has a semi-cylindrical shape. In a plan view perpendicular to the upper part 90b, the second terminal protector 91 has a center C2 and the second power line guide 92 has a center line CL2 extending from the center C2 to the second power line outlet 93. In this case, the center line CL2 bypasses the first terminal protector 81 and then bends to the second power line outlet 93 such that the direction of the center line CL2 approaches a direction parallel to the center line CL1. Therefore, the second power line guide 92 guides the second power lines 53 such that the second power lines 53 bypass the first terminal protector 81 and are directed in the same direction as that in which the first power line guide 82 guides the first power lines 43.

The second power line outlet 93 has a center C3 in a plan view perpendicular to the upper part 80b and the upper part 90b. In this case, a distance L1 between the center C1 and the center C3 is shorter than a distance L2 between the center C1 and the center C2.

Figure 11:
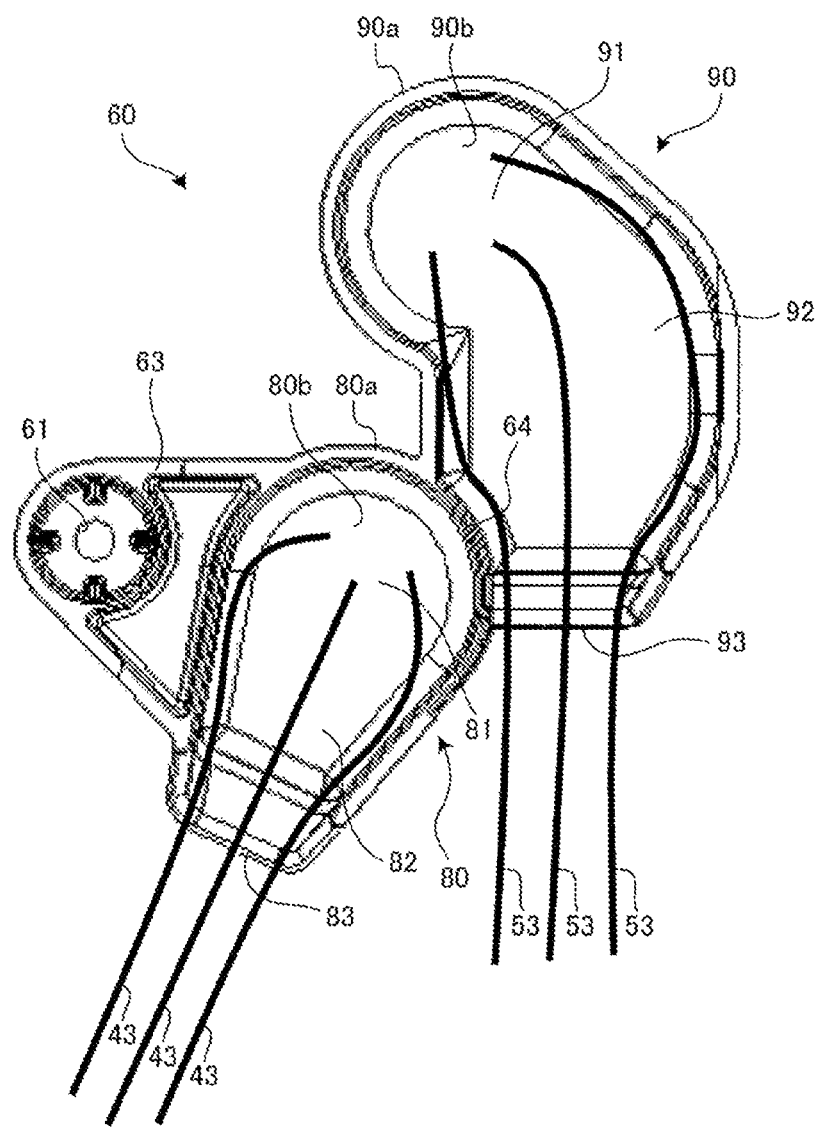
FIG. 11 is a diagram illustrating first power lines 43 guided by a first power line guide 82 and second power lines 53 guided by a second power line guide 92 in addition to the bottom plan view of the structure of the terminal cover 60 included in the compressor 30 according to Embodiment 1 of the present invention.

FIG. 11 is a diagram illustrating the first power lines 43 guided by the first power line guide 82 and the second power lines 53 guided by the second power line guide 92 in addition to the bottom plan view of the structure of the terminal cover 60 included in the compressor 30 according to Embodiment 1. The three first terminals 42 of the first glass-sealed terminal assembly 40 are oriented in different predetermined directions. Thus, the three first power lines 43 are dispersed such that the spacing between adjacent lines is progressively increased in the first terminal protector 81, as illustrated in FIG. 11. The first power line guide 82 causes the three first power lines 43 to extend toward each other and guides the three first power lines 43 in a predetermined guiding direction. The three first power lines 43 guided by the first power line guide 82 extend outward through the first power line outlet 83.

Similarly, the three second terminals 52 of the second glass-sealed terminal assembly 50 are oriented in different predetermined directions. Thus, the three second power lines 53 are dispersed such that the spacing between adjacent lines is progressively increased in the second terminal protector 91. The second power line guide 92 causes the three second power lines 53 to extend toward each other and guides the three second power lines 53 in the same direction as the guiding direction in which the first power lines 43 are guided. The three second power lines 53 guided by the second power line guide 92 extend outward through the second power line outlet 93. Consequently, the second power lines 53 extend outward through the second power line outlet 93 in substantially the same direction as that in which the first power lines 43 extend outward through the first power line outlet 83.

Therefore, the first power lines 43 drawing outward through the first power line outlet 83 and connected to the inverter board and the second power lines 53 drawing outward through the second power line outlet 93 and connected to the inverter board are allowed to extend along the same wiring path. This arrangement leads to increased ease of wiring of the compressor 30 in a production process of the outdoor unit 10.

The term "substantially the same" as used herein relative to directions includes not only exactly the same direction but also directions regarded as being identical to each other in view of the technical common knowledge in the art. If the first power lines 43 and the second power lines 53 extend outward through the outlets in substantially the same direction such that these lines extend along the same wiring path, the direction in which the first power lines 43 extend outward through the outlet and the direction in which the second power lines 53 extend outward through the outlet can be regarded as being identical to each other. For power lines used in the compressor 30 of the outdoor unit 10, the first power lines 43 and the second power lines 53 can be arranged along the same wiring path as long as the direction in which the first power lines 43 extend outward through the outlet forms an angle up to approximately 30 degrees with the direction in which the second power lines 53 extend outward through the outlet.

The terminal cover 60 in Embodiment 1 has the first power line outlet 83, through which the first power lines 43 connected to the first glass-sealed terminal assembly 40 extend outward, and the second power line outlet 93, through which the second power lines 53 connected to the second glass-sealed terminal assembly 50 extend outward, such that these outlets are separate from each other. This arrangement facilitates distinction between the first power lines 43 and the second power lines 53. This prevents the first power lines 43 and the second power lines 53 from being incorrectly connected to the inverter board.

A procedure including attaching the compressor 30 and wiring the compressor 30 will now be described as part of the production process of the air-conditioning-apparatus outdoor unit 10 according to Embodiment 1. The compressor 30 that is not covered with the terminal cover 60 is fastened to the machine chamber 15 of the outdoor unit 10. Then, the three first power lines 43 are connected to the first glass-sealed terminal assembly 40, and the three second power lines 53 are connected to the second glass-sealed terminal assembly 50. The three first power lines 43 and the three second power lines 53 are respectively drawn out of the first power line outlet 83 and the second power line outlet 93 in substantially the same direction, and the terminal cover 60 is attached to the upper surface 32a of the hermetic container 32. Then, the electric equipment 20 including the inverter board is attached to the upper part of the machine chamber 15. Three first power lines and three second power lines, serving as power lines to extend from the inverter board, are connected to the inverter board. The three first power lines 43 drawing from the compressor 30 are connected to the three first power lines drawing from the inverter board by the junction connectors for the first power lines. The three second power lines 53 extending from the compressor 30 are connected to the three second power lines extending from the inverter board by the junction connectors for the second power lines. At this time, the first power lines 43 and the second power lines 53 are arranged along the same wiring path in the outdoor unit 10. The operation of attaching and wiring the compressor 30 is completed in the above-described manner.

Figure 12:
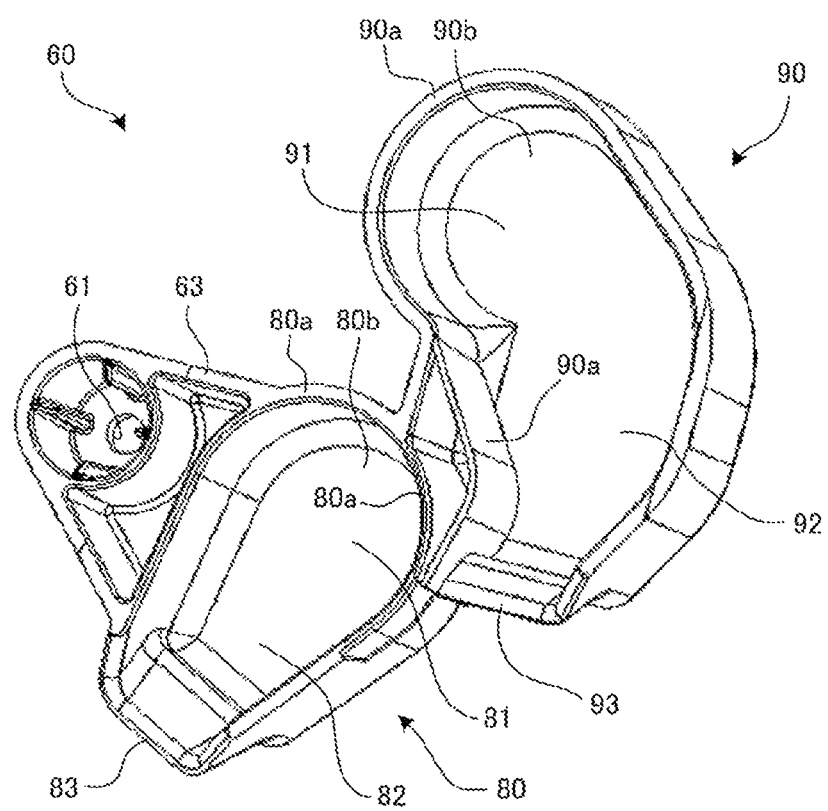
FIG. 12 is a perspective view of a modification of the structure of the terminal cover 60 included in the compressor 30 according to Embodiment 1 of the present invention.

FIG. 12 is a perspective view illustrating a modification of the structure of the terminal cover 60 included in the compressor 30 according to Embodiment 1. The terminal cover 60 of FIG. 12 differs from the terminal cover 60 illustrated in, for example, FIGS. 7 to 10 in that the side part 90a of the second power line guide 92 is separate from the side part 80a of the first terminal protector 81. This modification offers the same advantageous effects as those of the structure illustrated in, for example, FIGS. 7 to 10.

As described above, the compressor 30 according to Embodiment 1 includes the hermetic container 32, the electric motor 31 disposed in the hermetic container 32, the first glass-sealed terminal assembly 40 that is located at the upper surface 32a of the hermetic container 32 and includes the first terminals 42 electrically connected to the electric motor 31, the second glass-sealed terminal assembly 50 that is juxtaposed to the first glass-sealed terminal assembly 40 at the upper surface 32a of the hermetic container 32 and includes the second terminals 52 electrically connected to the electric motor 31, and the terminal cover 60 attached to the hermetic container 32 to cover the first glass-sealed terminal assembly 40 and the second glass-sealed terminal assembly 50. The terminal cover 60 includes the first terminal protector 81 protecting the first glass-sealed terminal assembly 40, the first power line guide 82 guiding the first power lines 43 connected in one-to-one correspondence to the first terminals 42 of the first glass-sealed terminal assembly 40, the first power line outlet 83 through which the first power lines 43 guided by the first power line guide 82 extend out of the terminal cover 60, the second terminal protector 91 protecting the second glass-sealed terminal assembly 50, the second power line guide 92 guiding the second power lines 53 connected in one-to-one correspondence to the second terminals 52 of the second glass-sealed terminal assembly 50, and the second power line outlet 93 through which the second power lines 53 guided by the second power line guide 92 extend out of the terminal cover 60. The first power line guide 82 guides the first power lines 43 in the guiding direction (e.g., the direction along the center line CL1) away from the second terminal protector 91. The second power line guide 92 guides the second power lines 53 such that the second power lines bypass the first terminal protector 81 and are directed in the same direction as the above-described guiding direction. The upper surface 32a is an example of the outer surface of the hermetic container 32.

In such a configuration, the terminal cover 60 includes the first power line outlet 83, through which the first power lines 43 extend outward, and the second power line outlet 93, through which the second power lines 53 extend outward. This arrangement facilitates distinction between the first power lines 43 connected to the first glass-sealed terminal assembly 40 and the second power lines 53 connected to the second glass-sealed terminal assembly 50. This prevents the first power lines 43 and the second power lines 53 from being incorrectly connected to the power source. Additionally, in this configuration, the first power lines 43 extend outward through the first power line outlet 83 and the second power lines 53 extend outward through the second power line outlet 93. This arrangement prevents entanglement of the first power lines 43 and the second power lines 53 at the outlets.

This arrangement enables the direction in which the first power lines 43 extend outward through the first power line outlet 83 to be substantially the same as that in which the second power lines 53 extend outward through the second power line outlet 93. This enables the first power lines 43 and the second power lines 53 to be arranged along the same wiring path. This leads to increased ease of wiring of the compressor 30.

In the compressor 30 according to Embodiment 1, the second power line guide 92 is located adjacent to the first terminal protector 81. The second power line guide 92 is separated from the first terminal protector 81 by the partition wall 64, which serves as both the side part 90a of the second power line guide 92 and the side part 80a of the first terminal protector 81. This arrangement leads to a simplified shape of the terminal cover 60.

In the compressor 30 according to Embodiment 1, the first glass-sealed terminal assembly 40 includes the first base 41 protruding from the upper surface 32a of the hermetic container 32. The second glass-sealed terminal assembly 50 includes the second base 51 protruding from the upper surface 32a of the hermetic container 32. The side part 80a of the first terminal protector 81 extends along part of the periphery of the first base 41. The side part 90a of the second terminal protector 91 extends along part of the periphery of the second base 51. This arrangement enables the terminal cover 60 to be easily positioned relative to the hermetic container 32 when the side part 80a of the first terminal protector 81 is brought into contact with the periphery of the first base 41 and the side part 90a of the second terminal protector 91 is brought into contact with the periphery of the second base 51. In addition, this arrangement enables the terminal cover 60 to be easily positioned in a rotating direction of the terminal cover 60 around the bolt 33 when the terminal cover 60 is attached relative to the bolt 33. This leads to increased ease of assembly of the compressor 30.

In the compressor 30 according to Embodiment 1, the first power line outlet 83 and the second power line outlet 93 are not aligned with each other as viewed in the direction perpendicular to the upper parts 80b and 90b of the terminal cover 60. This arrangement allows easier distinction between the first power lines 43 connected to the first glass-sealed terminal assembly 40 and the second power lines 53 connected to the second glass-sealed terminal assembly 50.

In the compressor 30 according to Embodiment 1, the distance L1 between the center C1 of the first terminal protector 81 and the center C3 of the second power line outlet 93 is shorter than the distance L2 between the center C1 of the first terminal protector 81 and the center C2 of the second terminal protector 91. This arrangement enables the set of first power lines 43 and the set of second power lines 53 to approach each other and then to be extended out of the terminal cover 60 even when the first glass-sealed terminal assembly 40 is located at a long distance from the second glass-sealed terminal assembly 50. This further increases ease of arrangement of the first power lines 43 and the second power lines 53.

The air-conditioning-apparatus outdoor unit 10 according to Embodiment 1 includes the above-described compressor 30. Such a configuration allows the air-conditioning-apparatus outdoor unit 10 to offer the same advantageous effects as those described above.

REFERENCE SIGNS LIST 10 outdoor unit 11 front panel 12 side panel 13 top panel 14 fan chamber 15 machine chamber 16 partition 17 heat exchanger 18 fan refrigerant pipe 20 electric equipment 30 compressor 31 electric motor hermetic container 32a upper surface 33 bolt 34 discharge pipe 40 first glass-sealed terminal assembly 41 first base 42 first terminal 43 first power line 50 second glass-sealed terminal assembly 51 second base 52 second terminal 53 second power line 60 terminal cover 61 fastening hole nut 63 fastening portion 64 partition wall 70 inverter 71 connection switching device 80 first cover portion 80a side part 80b upper part 81 first terminal protector 82 first power line guide 83 first power line outlet 90 second cover portion 90a side part 90b upper part 91 second terminal protector 92 second power line guide 93 second power line outlet C1, C2, C3 center CL1, CL2 center line L1, L2 distance

The invention claimed is:

1. A compressor comprising:
a hermetic container;
an electric motor disposed in the hermetic container;
a first glass-sealed terminal assembly located at an outer surface of the hermetic container, the first glass-sealed terminal assembly including first terminals electrically connected to the electric motor;
a second glass-sealed terminal assembly juxtaposed to the first glass-sealed terminal assembly at the outer surface of the hermetic container, the second glass-sealed terminal assembly including second terminals electrically connected to the electric motor; and
a terminal cover, attached to the hermetic container, and including a first cover portion to cover the first glass-sealed terminal assembly and a second cover portion to cover the second glass-sealed terminal assembly,
wherein the first cover portion and second cover portions are of different shapes when viewed from above in a plan view,
wherein the terminal cover includes
  a first terminal protector protecting the first glass-sealed terminal assembly,
  a first power line guide guiding first power lines connected in one-to-one correspondence to the first terminals of the first glass-sealed terminal assembly,
  a first power line outlet through which the first power lines guided by the first power line guide extend of the terminal cover,
  a second terminal protector protecting the second glass-sealed terminal assembly,
  a second power line guide guiding second power lines connected in one-to-one correspondence to the second terminals of the second glass-sealed terminal assembly, and
  a second power line outlet through which the second power lines guided by the second power line guide extend out of the terminal cover, wherein the first power line guide guides the first power lines in a guiding direction away from the second terminal protector, and
wherein the second power line guide guides the second power lines such that the second power lines bypass the first terminal protector and are directed in a direction identical to the guiding direction.

2. The compressor of claim 1,
wherein the second power line guide is located adjacent to the first terminal protector, and
wherein the second power line guide is separated from the first terminal protector by a partition wall that serves as both side part of the second power line guide and side part of the first terminal protector.

3. The compressor of claim 1,
wherein the first glass-sealed terminal assembly includes a first base protruding from the outer surface of the hermetic container,
wherein the second glass-sealed terminal assembly includes a second base protruding from the outer surface of the hermetic container,
wherein the first terminal protector includes side part extending along part of a periphery of the first base, and
wherein the second terminal protector includes side part extending along part of a periphery of the second base.

4. The compressor of claim 1
wherein the first power line outlet and the second power line outlet are not aligned with each other as viewed in a direction perpendicular to upper part of the terminal cover.

5. The compressor of claim 1
wherein a distance between a center of the first terminal protector and a center of the second power line outlet is shorter than a distance between the center of the first terminal protector and a center of the second terminal protector.

6. An outdoor unit of an air-conditioning apparatus, the outdoor unit comprising:
the compressor of claim 1.

7. A compressor comprising:
a hermetic container;
an electric motor disposed in the hermetic container;
a first glass-sealed terminal assembly located at an outer surface of the hermetic container, the first glass-sealed terminal assembly including first terminals electrically connected to the electric motor;
a second glass-sealed terminal assembly juxtaposed to the first glass-sealed terminal assembly at the outer surface of the hermetic container, the second glass-sealed terminal assembly including second terminals electrically connected to the electric motor; and
a terminal cover attached to the hermetic container to cover the first glass-sealed terminal assembly and the second glass-sealed terminal assembly,
wherein the terminal cover includes
  a first terminal protector protecting the first glass-sealed terminal assembly,
  a first power line guide guiding first power lines connected in one-to-one correspondence to the first terminals of the first glass-sealed terminal assembly,
  a first power line outlet through which the first power lines guided by the first power line guide extend of the terminal cover,
  a second terminal protector protecting the second glass-sealed terminal assembly, a second power line guide guiding second power lines connected in one-to-one correspondence to the second terminals of the second glass-sealed terminal assembly, and a second power line outlet through which the second power lines guided by the second power line guide extend out of the terminal cover, wherein the first power line guide guides the first power lines in a guiding direction away from the second terminal protector, wherein the second power line guide guides the second power lines such that the second power lines bypass the first terminal protector and are directed in a direction identical to the guiding direction, wherein the second power line guide is located adjacent to the first terminal protector, and wherein the second power line guide is separated from the first terminal protector by a partition wall that serves as both side part of the second power line guide and side part of the first terminal protector.

* * * * *